(12) United States Patent
Lubic et al.

(10) Patent No.: US 12,302,885 B2
(45) Date of Patent: May 20, 2025

(54) INSECT TRAP RECEPTACLE

(71) Applicant: Woodstream Corporation, Lancaster, PA (US)

(72) Inventors: Marko Lubic, Shillington, PA (US); Michael Adamson, Elizabethtown, PA (US); Adam V. Malavé, Elizabethtown, PA (US)

(73) Assignee: Woodstream Corporation, Lancaster, PA (US)

( * ) Notice: Subject to any disclaimer, the term of this patent is extended or adjusted under 35 U.S.C. 154(b) by 46 days.

(21) Appl. No.: 17/503,813

(22) Filed: Oct. 18, 2021

(65) Prior Publication Data

US 2023/0123062 A1   Apr. 20, 2023

(51) Int. Cl.
*A01M 1/10* (2006.01)

(52) U.S. Cl.
CPC .................................. *A01M 1/10* (2013.01)

(58) Field of Classification Search
CPC .......... A01M 1/10; A01M 1/106; A01M 1/04; A01M 1/06; A01M 1/08; A01M 1/145; B65D 88/54; B65D 2588/54; B65D 43/16; B65D 43/163; B65D 43/165; B65D 45/20
USPC ........................ 43/74; 220/625, 916, 730, 830
See application file for complete search history.

(56) References Cited

U.S. PATENT DOCUMENTS

| | | | | |
|---|---|---|---|---|
| 543,127 A | * | 7/1895 | Byers ...................... | B65D 25/24 292/303 |
| 631,358 A | * | 8/1899 | Campell ................. | G01F 11/24 220/628 |
| 958,208 A | * | 5/1910 | Anderson ............. | A01M 1/106 43/122 |
| 1,200,993 A | * | 10/1916 | Seasholtz .............. | A01M 1/223 43/119 |
| 1,269,623 A | * | 6/1918 | Logsdon ................ | A01K 69/10 43/65 |
| 1,297,894 A | * | 3/1919 | Navrot ................ | A01M 1/2016 43/122 |
| 1,328,850 A | * | 1/1920 | Skelton ................... | A01M 1/02 43/118 |
| 1,333,470 A | * | 3/1920 | Curran .................. | A01M 1/106 43/107 |
| 1,359,060 A | * | 11/1920 | Hassell .................... | A01M 1/02 43/118 |

(Continued)

FOREIGN PATENT DOCUMENTS

| | | | | |
|---|---|---|---|---|
| CN | 104755110 A | * | 7/2015 | .......... A01M 1/2033 |
| EP | 0658306 A1 | * | 6/1995 | |

(Continued)

OTHER PUBLICATIONS

Merged translation of EP-0658306-A1 (Year: 1995).*

(Continued)

*Primary Examiner* — Morgan T Jordan
(74) *Attorney, Agent, or Firm* — Barley Snyder

(57) ABSTRACT

A receptacle for use with an insect trap comprises a hollow body defining an open upper end for attaching to the insect trap and for receiving insects from the trap, and an open lower end. A floor of the receptacle is mounted to the lower end of the body and is movable between a closed position wherein the floor covers the open lower end, and an open position wherein the lower end is open and exposed to a surrounding environment.

19 Claims, 5 Drawing Sheets

(56) References Cited

U.S. PATENT DOCUMENTS

| | | | | |
|---|---|---|---|---|
| 1,368,767 | A * | 2/1921 | Smedberg | A01M 1/04 43/113 |
| 1,543,968 | A * | 6/1925 | Williams | A01K 97/04 43/56 |
| 1,890,116 | A * | 12/1932 | Jackson | A01M 1/223 43/118 |
| 2,767,511 | A * | 10/1956 | Kissner | A01M 1/2077 422/305 |
| 3,370,787 | A * | 2/1968 | Lindholm | B65F 1/06 D34/1 |
| 3,817,371 | A * | 6/1974 | Gatter | B65D 5/04 239/57 |
| 3,997,072 | A * | 12/1976 | Guth | B65F 1/12 141/390 |
| 4,006,818 | A | 2/1977 | Wannyn | |
| 4,501,088 | A * | 2/1985 | Boisvert | A01M 1/02 43/118 |
| 4,675,504 | A * | 6/1987 | Suhajda | A01M 1/2077 392/390 |
| 5,392,560 | A * | 2/1995 | Donahue | A01M 1/106 43/118 |
| 5,662,835 | A * | 9/1997 | Collingwood | A01M 1/2044 239/45 |
| 5,758,765 | A | 6/1998 | Ovadia | |
| 5,896,697 | A * | 4/1999 | Kang | A01M 1/04 43/107 |
| 6,158,166 | A * | 12/2000 | Snell | A01M 31/002 43/132.1 |
| 6,293,044 | B1 * | 9/2001 | Feng | A01M 29/16 43/132.1 |
| 6,393,760 | B1 * | 5/2002 | Lingren | A01N 31/14 43/107 |
| 6,532,695 | B1 * | 3/2003 | Alvarado | A01M 1/2016 43/107 |
| 6,817,140 | B1 | 11/2004 | Durand et al. | |
| 6,840,005 | B2 | 1/2005 | Durand et al. | |
| 6,892,492 | B2 | 5/2005 | Durand et al. | |
| 6,989,082 | B2 | 1/2006 | Malsbury et al. | |
| 9,296,280 | B2 | 3/2016 | Ehrlich | |
| 9,826,850 | B2 | 11/2017 | Hasani | |
| 10,178,860 | B2 * | 1/2019 | Wesson | A01M 1/106 |
| 10,681,903 | B2 * | 6/2020 | Eom | A01M 1/08 |
| 10,752,399 | B2 | 8/2020 | Vandecasteele | |
| 10,794,100 | B2 | 10/2020 | Ehrlich | |
| 12,022,817 | B1 * | 7/2024 | Draeger | A01M 1/04 |
| 2001/0047612 | A1 * | 12/2001 | Prince | A01M 1/04 43/58 |
| 2002/0170874 | A1 * | 11/2002 | Hou | A47G 19/2266 215/229 |
| 2004/0040198 | A1 * | 3/2004 | Harris | A01M 1/106 43/107 |
| 2004/0231229 | A1 * | 11/2004 | Lenker | A01M 1/106 43/107 |
| 2008/0011875 | A1 * | 1/2008 | Sipinski | B05B 17/0684 239/326 |
| 2010/0200581 | A1 * | 8/2010 | Maltz | B65D 43/165 220/326 |
| 2011/0148329 | A1 * | 6/2011 | Demarest | A01M 1/2044 362/249.02 |
| 2011/0265369 | A1 * | 11/2011 | Cink | A01M 1/026 424/84 |
| 2012/0110894 | A1 * | 5/2012 | Black | A01M 1/026 43/131 |
| 2014/0165452 | A1 * | 6/2014 | Rocha | A01M 1/08 43/139 |
| 2014/0237892 | A1 * | 8/2014 | Peden | A01M 1/20 43/109 |
| 2017/0247151 | A1 * | 8/2017 | Chiou | B65D 43/163 |
| 2018/0213763 | A1 * | 8/2018 | Lee | F21V 23/00 |
| 2021/0323737 | A1 * | 10/2021 | Gross | A47J 41/0027 |
| 2022/0132824 | A1 * | 5/2022 | Toledo | A01M 1/145 43/113 |
| 2022/0315285 | A1 * | 10/2022 | Hunt | B65D 83/08 |

FOREIGN PATENT DOCUMENTS

| | | | | |
|---|---|---|---|---|
| EP | 1679001 | A2 * | 7/2006 | A01M 1/02 |
| KR | 20160008284 | A * | 1/2016 | |

OTHER PUBLICATIONS

Merged translation of EP-1679001-A2 (Year: 2006).*
Merged translation of CN-104755110-A (Year: 2015).*
Www.katchybug.com; Indoor Insect Trap/UV Light Bug Trap/ Katchy Bug; Copyright 2022 Katchy Bug; downloaded May 10, 2022, 4 pages.

* cited by examiner

INSECT TRAP RECEPTACLE

FIELD OF THE INVENTION

The present invention relates to the field of pest control, and more particularly, to an improved insect basket or receptacle for use with an insect trap.

BACKGROUND

Insect traps typically include a receptacle or bag fitted thereto for collecting insects either killed or captured by the trap. Periodically, the receptacle must be emptied by a user. This is typically achieved by removing the receptacle from the trap, and inverting the receptacle such that insect waste is expelled via a top opening thereof. These operations are somewhat complex, time consuming and unnecessarily messy. Moreover, in the case of a live-catch trap in which live insects are caught within the receptacle, it is difficult to ensure that these insects remain captured during the emptying process.

Accordingly, there is a need for improved an receptacle which allows easier and cleanlier emptying, while being able to retain captured insects.

SUMMARY

A receptacle for use with an insect trap according to an embodiment of the present disclosure has a hollow body defining an open upper end adapted to attach to the insect trap for receiving insects from the trap, and an open lower end. A floor of the receptacle is mounted to the lower end of the body and is movable between a closed position wherein the floor covers the open lower end, and an open position wherein the lower end is open to a surrounding environment.

According to another embodiment of the present disclosure, an insect trap includes a trap housing defining an opening for receiving insects from an external environment, and a receptacle removably attached to the trap housing for retaining captured insects. The receptacle includes a body defining an open upper end in communication with the trap opening for receiving insects and an open lower end, and a floor pivotally mounted to the lower end body. The floor is movable with respect to the body between a closed position wherein the floor closes the open lower end of the body, and an open position wherein the lower end of the body is open and to a surrounding environment.

BRIEF DESCRIPTION OF THE DRAWINGS

The invention will now be described by way of example with reference to the accompanying figures, of which.

DETAILED DESCRIPTION OF THE EMBODIMENTS

Figure 1:
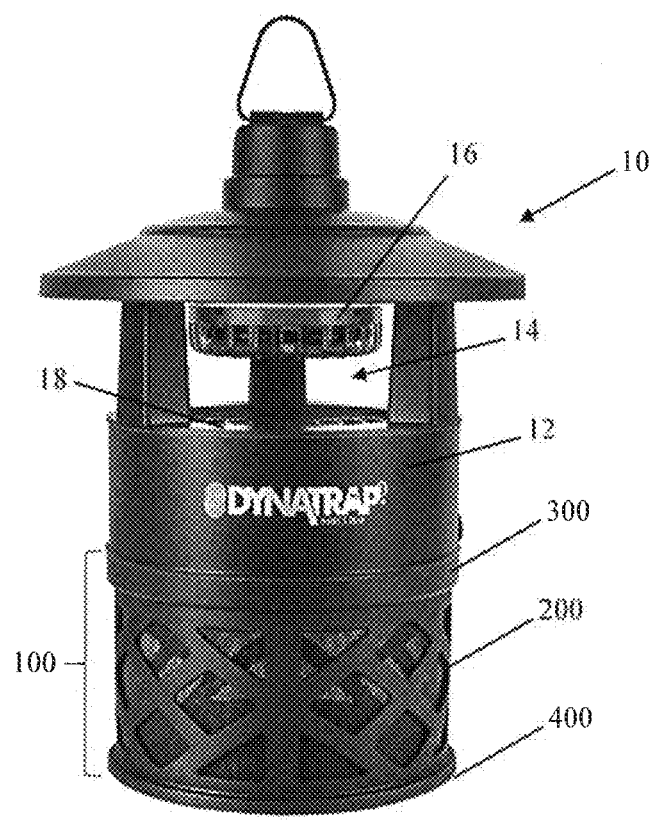
FIG. 1 is a perspective front view of an insect trap including an insect receptacle according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include an insect trap and an associated receptacle for storing trapped insects. The receptacle includes a hollow body defining an open upper end for attaching to the insect trap for receiving insects, and an open lower end. A floor of the receptacle is mounted to the lower end of the body and is movable between a closed position wherein the floor covers the lower end, and an open position wherein the lower end is open and exposed to the surrounding environment. The movable floor enables easy emptying of the receptacle by a user by eliminating the need to remove the receptacle from the trap.

With reference to FIG. 1, an insect trap 10 according to an embodiment of the present disclosure includes a trap body 12 defining an opening 14 for receiving insects therethrough. The trap body 12 houses, for example, a light source 16 for luring insects from the environment and into the opening 14, and a fan 18 for pulling insects from within the opening into a receptacle or receptacle assembly 100, wherein the insects are captured. In other embodiments, the trap 10 may include an electrified feature for killing the insects on contact, wherein they subsequently fall into the receptacle assembly 100. The insect receptacle assembly 100 according to an embodiment of the present disclosure includes a main body 200, a locking ring 300 and a movable bottom or floor 400.

Figure 2A:
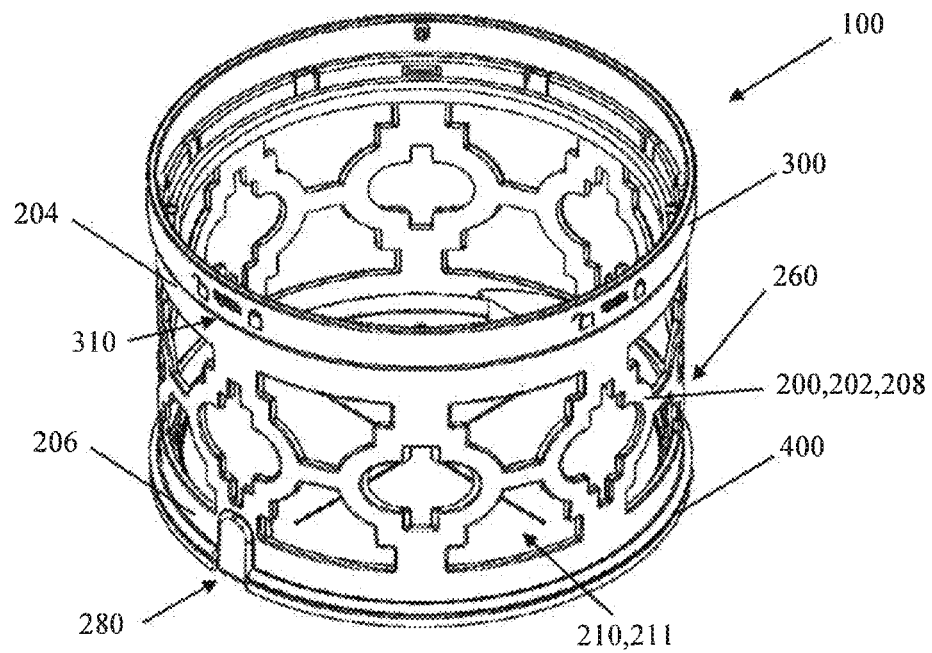
FIG. 2A is a top perspective view of an insect receptacle according to an embodiment of the present disclosure with a floor thereof in a closed position.
Figure 2B:
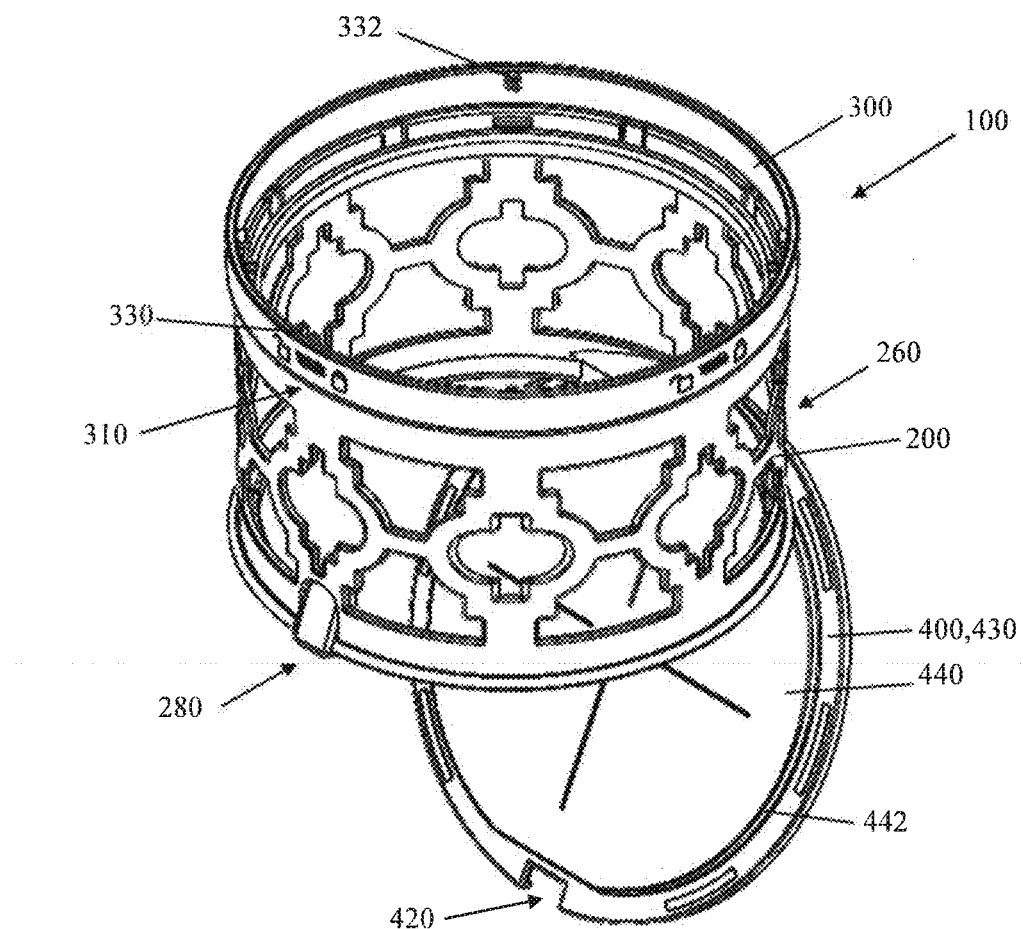
FIG. 2B is a top perspective view of the insect receptacle of FIG. 2A with the floor in an open position.

Referring now to FIGS. 2A and 2B, the main body 200 of the receptacle assembly 100 comprises a generally hollow cylindrical profile including a circumferential wall 202. The circumferential wall 202 includes a top cylindrical portion or ring 204 and a bottom cylindrical portion or ring 206. The top ring 204 is continuous in the circumferential direction, while the bottom ring 206 is generally continuous in the circumferential direction between two recesses or pockets 230,240 (see FIG. 4) formed therein. An intermediate cylindrical portion 208 of the circumferential wall 202 joins or connects the top and bottom rings 204,206. The intermediate portion 208 defines a pattern of windows or openings 210 formed therethrough. The windows 210 may be covered with a transparent or otherwise at least partially see-through material 211, such as a mesh screen or a transparent polymer, preventing captured insects from escaping the receptacle. In this way, the windows 210 enable a user to inspect the interior of the receptacle in order to determine if it needs to be emptied or if it should be relocated in the absence of significant insect presence, by way of example only.

The floor 400 and main body 200 define a pivoting connection 260 therebetween, as well as a release mechanism 280 arranged opposite the pivoting mount on the bottom ring 206 (i.e., 180 degrees therefrom). The pivoting connection 260 and the release mechanism 280 enable the selective release of the floor 400 from a closed position, as shown in FIG. 2A, to an open position, as shown in FIG. 2B. In the open position, the floor 400 is dropped or pivoted away from the main body 200, and the contents of the receptacle are free to fall under the force of gravity into, for example, a waste bag or other container positioned by a user below the receptacle assembly 100.

Figure 3:
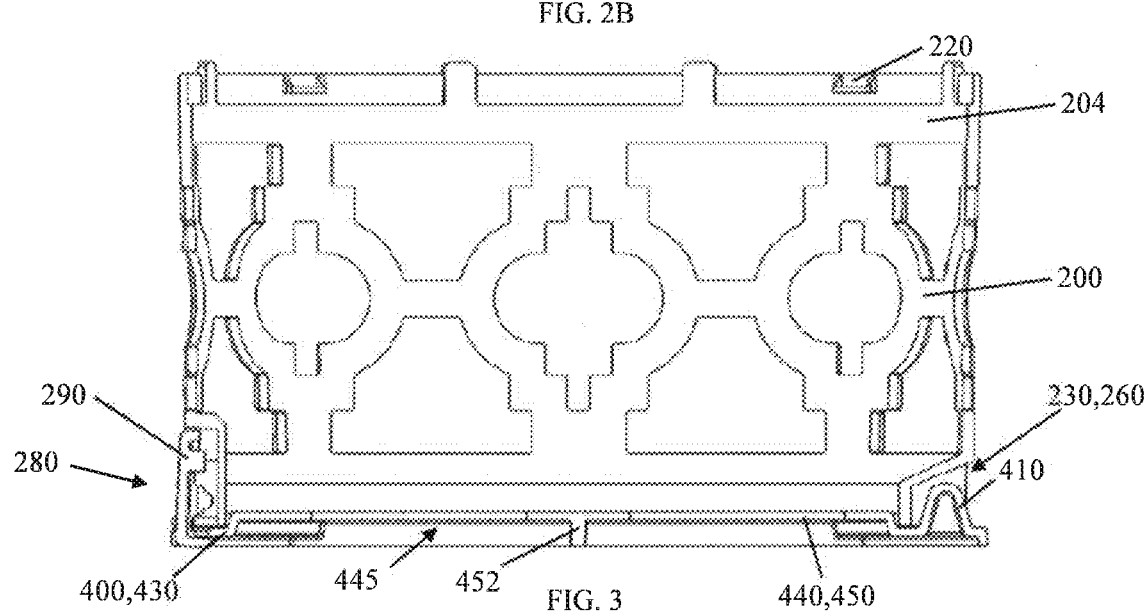
FIG. 3 is a side cross-sectional view of the insect receptacle of FIG. 2A.
Figure 4:
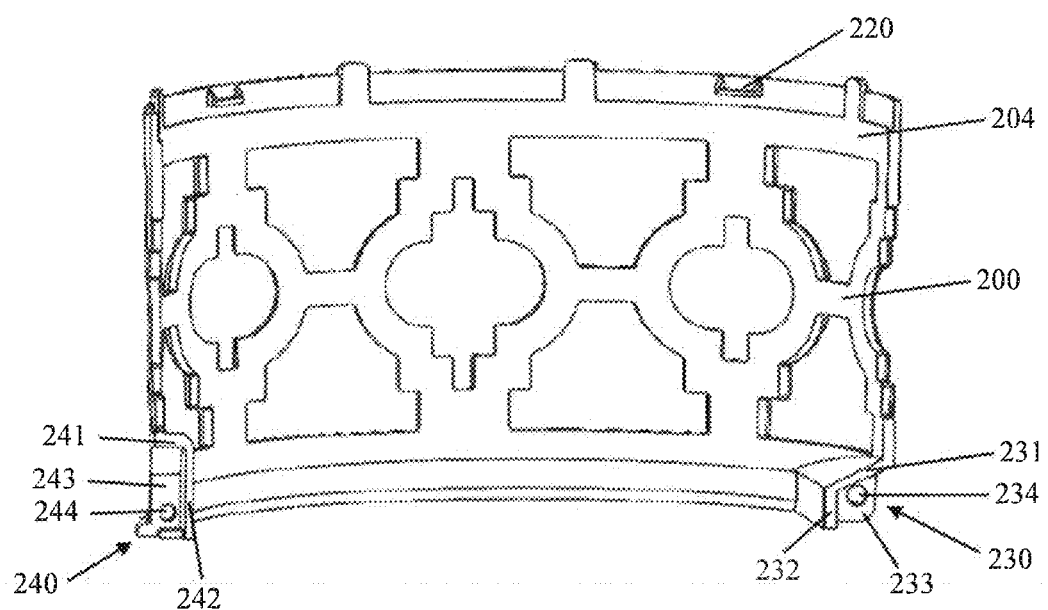
FIG. 4 is a side cross-sectional view of the insect receptacle of FIG. 2A with the floor removed.

As shown in FIGS. 3 and 4, the top ring 204 of the main body 200 comprises a plurality of snap features or projecting latches 220 formed on an interior surface thereof for engaging with corresponding locking recesses or other complementary features formed on the locking ring 300. The latches 220 enable the fixed attachment of the locking ring 300 to the main body 200. The locking ring 300 also includes locking features, such as protrusions 330 or bosses 332 (e.g., cylindrical protrusions, as shown in FIGS. 2A and 2B) extending radially inward and configured to selectively engage with the trap body 12 of the insect trap 10. The locking ring 300, and thus the receptacle assembly 100, is selectively lockable to the insect trap 10 via the engaging of the locking features 330,332 with corresponding locking features formed in or on the insect trap 10. This selective locking may be achieved by, for example, the partial rotation of the receptacle assembly 100 relative to the trap body 12 for engaging and disengaging the corresponding locking features, as shown via the directional indication 310 formed on the locking ring 300.

Figure 5:
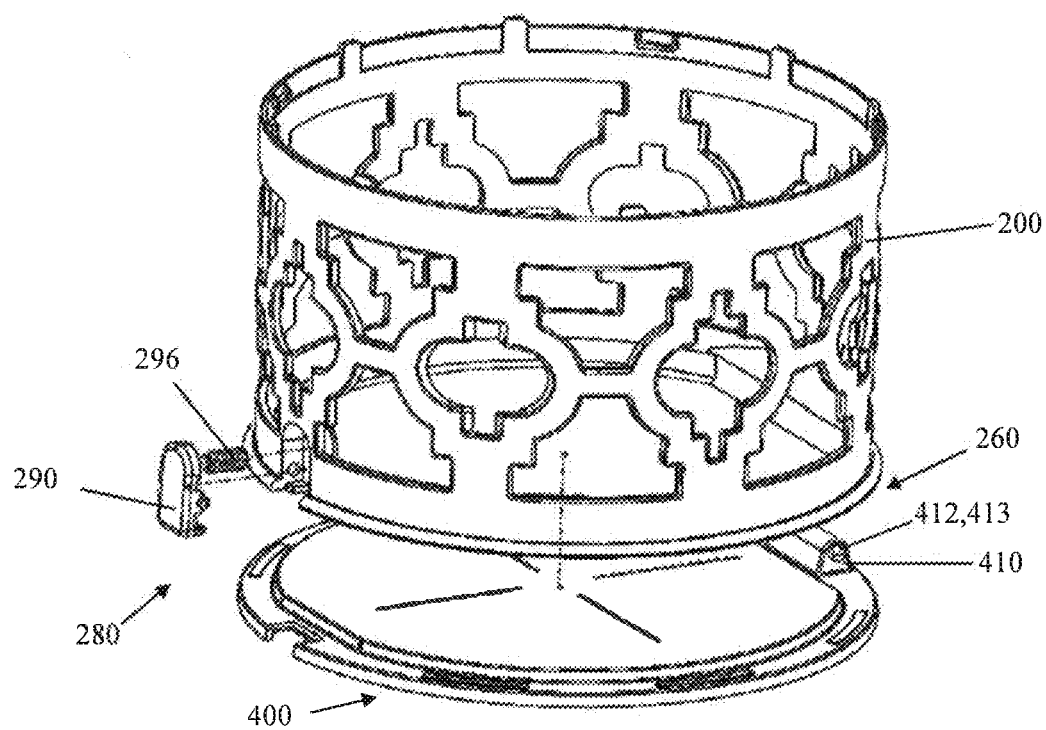
FIG. 5 is an exploded side perspective view of the insect receptacle of FIG. 2A.

Still referring to FIGS. 3 and 4, the bottom ring 204 defines the first recess or pocket 230 on an exterior thereof for receiving a hinge block or mount 410 of the bottom or floor 400. Specifically, the first recess 230 is defined by an obliquely, radially-inward extending portion or wall 231 and a vertically downwardly extending portion or wall 232 of the bottom ring 206. Two opposing lateral wall segments 233 (one side shown in FIG. 4) define opposite lateral sides of the recess 230, and include coaxial openings 234 formed at least partially therethrough. The openings 234 serve as mounting points for receiving corresponding cylindrical pivoting axles or protrusions 412 protruding from the hinge mount 410 of the floor 400, as shown in FIG. 5. The pivoting axles 412 may each define a chamfer 413 formed on an end thereof for facilitating their introduction into the openings 234. In this way, the recess 230 and openings 234 define one-half of the pivoting connection 260, with the hinge mount 410 of the floor 400 engageable therewith defining the remainder thereof. As shown in FIGS. 2A and 2B, this connection allows for the floor 400 to be pivoted from a closed position to an open position, and more specifically, allows for over 90 degrees of rotation of the floor 400 relative to the main body 200 about a pivoting axis defined by the openings 234 and axles 412.

Still referring generally to FIGS. 3 and 4, the second recess or pocket 240 is formed generally opposite the first recess 230, and is defined by a radially-inward extending portion or wall 241 and a vertically downwardly extending portion or wall 242 of the bottom ring 206. Two opposing lateral wall segments 243 define opposite lateral sides of the recess 240, and include coaxial openings 244 formed at least partially therethrough. The openings 244 serve as mounting points for receiving corresponding cylindrical pivoting axles or protrusions 298 extending from lateral sides of a pivoting release button or latch 290 of the release mechanism 280. See FIGS. 7A-7C.

Figure 6A:
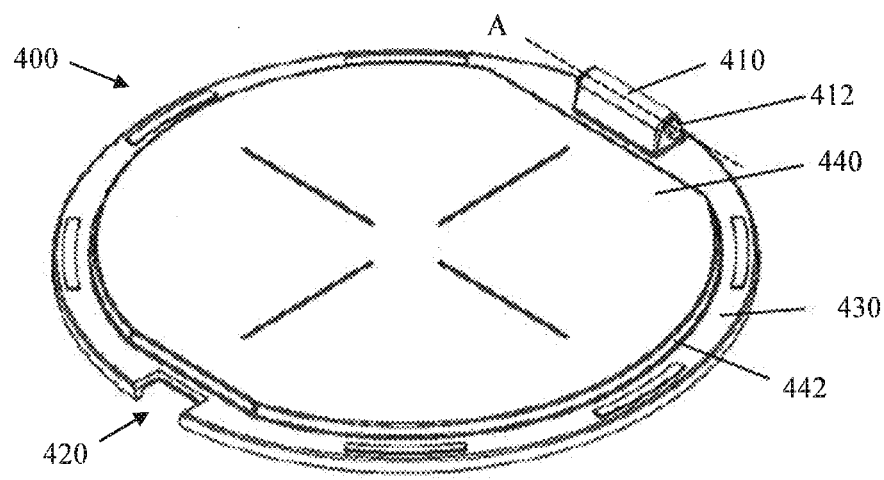
FIG. 6A is a perspective view of a floor of a receptacle according to an embodiment of the present disclosure.
Figure 6B:
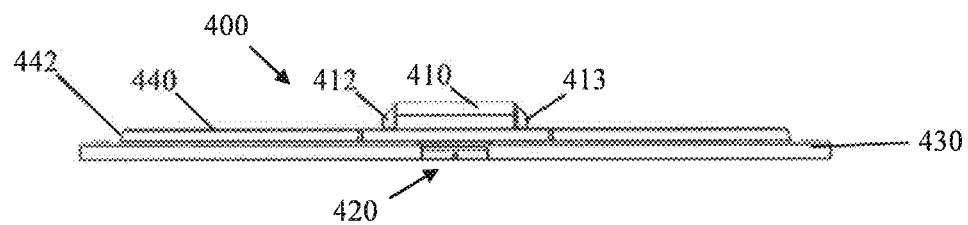
FIG. 6B is a side view of the floor of FIG. 6A.
Figure 6C:
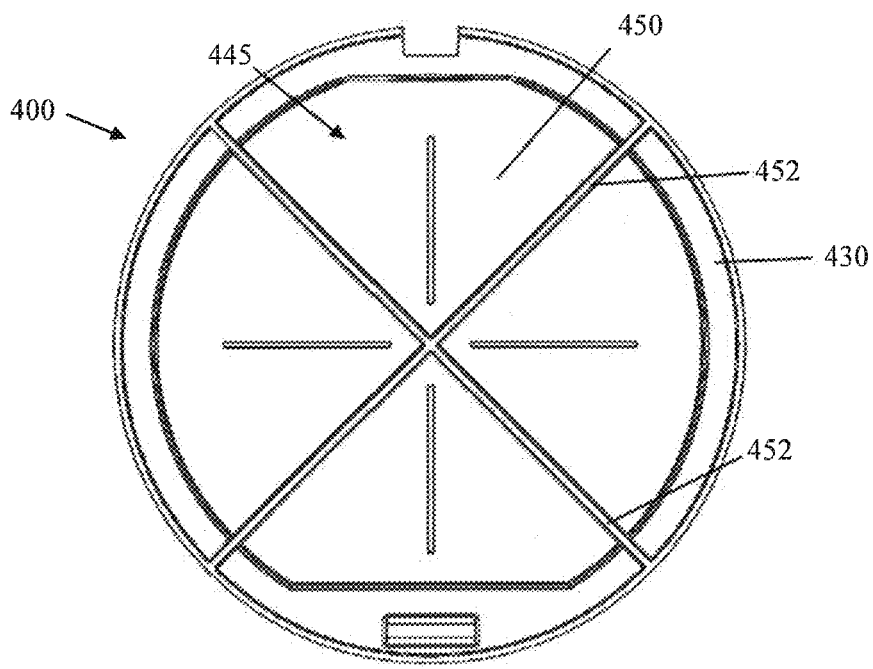
FIG. 6C is a bottom view of the floor of FIG. 6A.

Referring now to FIGS. 6A through 6C, a base 430 of the floor 400 defines a raised center section 440, including a generally vertical perimeter wall 442 extending upwardly from the base and continuously about a perimeter of the raised section. The perimeter wall 442 is sized and shaped correspondingly to an interior wall of the bottom ring 206 such that the wall and bottom ring abut or closely oppose one another continuously about their perimeters when the floor 400 is in the closed position, as shown in FIG. 3. In this way, an improved seal is realized between the floor 400 and the main body 200. An underside or bottom 450 of the floor 400 includes a recessed pocket 445 corresponding to the raised section 440. Stiffening ribs 452, for example two orthogonally oriented ribs, may span a diameter of the floor 400, adding strength and stiffness to the floor. This added stiffness is particularly beneficial in preventing deformation of the floor during opening and closing operations. A latching recess 420 is formed in the base 430 for engaging with the release latch 290, as will be set forth in greater detail herein.

Figure 7A:
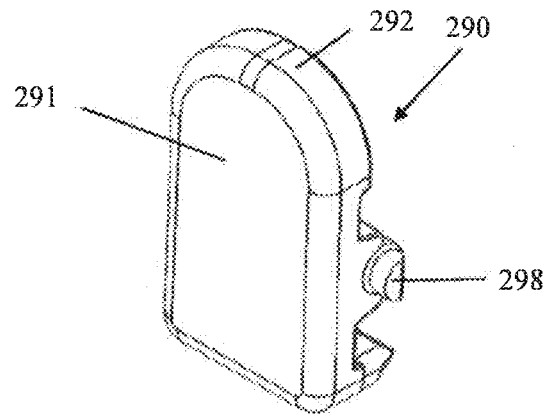
FIG. 7A is a front perspective view of a floor latch according to an embodiment of the present disclosure.
Figure 7B:
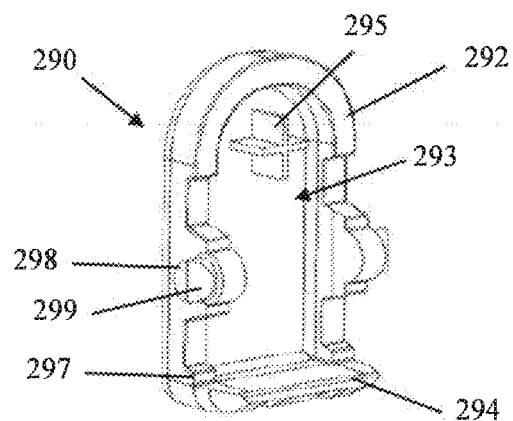
FIG. 7B is a rear perspective view of the floor latch of FIG. 7A.
Figure 7C:
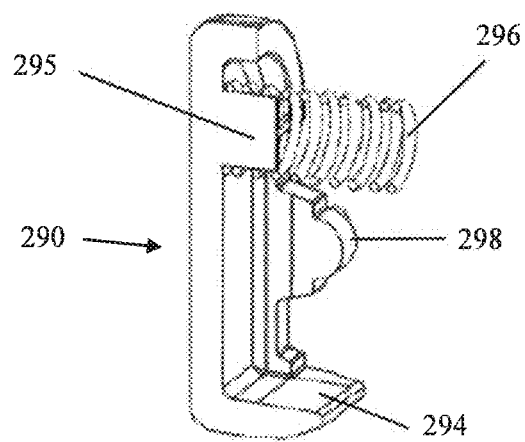
FIG. 7C is a side cross-sectional perspective view of the floor latch of FIG. 7A including a return spring.

Referring to FIGS. 7A through 7C, the release latch 290 includes a generally flat outer face 291 providing an easily engageable pressing surface for a user to apply an inward pressure thereon. A perimeter wall 292 extends inwardly from the outer face 291 and defines a recessed interior or cavity 293. The perimeter wall 292 further defines an inwardly-extending latching protrusion 294 formed on the bottom of the latch 290 for engaging with the latching recess 420 of the floor 400. Coaxial mounting protrusions or axles 298 are formed on the perimeter wall 292 for engaging with the openings 244 of the recess 240. The axles 298 may also include chamfers 299 on free ends thereof for facilitating easy installation of the latch 290.

A mounting feature or boss 295 may be provided proximate a top of the latch 290, and extends outwardly from the recessed interior 293. The boss 295 serves as a mounting post or guide for an elastic element, such as a coil spring 296. The coil spring 296 acts on the wall 242 of the recess 240 to bias the latch 290 into a locked position, wherein the latching protrusion 294 engages with the recess 420 of the floor 400. The latch 290 is released from the locked position and rotated into an unlocked position against the spring bias by pressure applied to a top of the outer face 291 by a user, releasing the floor 400. The top portion of the perimeter wall 292 serves as a mechanical stop against the recess 240, limiting the rotation of the latch 290 in the release direction, as well as the compression of the spring 296. Similar protruding segments 297 of the wall 292 are defined on a lower portion thereof, and act as mechanical stops against an outer edge of the recess 420 defined in the floor 400, limiting the rotation of the latch 290 in the latching or locking direction.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An insect trap receptacle, comprising:
   a hollow body defining an open upper end attachable to the insect trap for receiving insects from the trap, and an open lower end;
   a floor mounted to the lower end of the body and movable between a closed position wherein the floor covers the open lower end, and an open position wherein the lower end is open and to a surrounding environment, the floor including:
      a base abutting the lower end of the body; and
      a raised center portion extending from the base and into an interior of the body with the floor in the closed position, the raised center portion of the floor includes a perimeter wall extending from the base of the floor and a raised platform arranged within the perimeter wall, the perimeter wall defines a corresponding recess formed in an underside of the floor, and a plurality of stiffening ribs defined by the floor are arranged at least partially within the recess; and
   a latch mounted to the body and extending below the floor, the latch engaging with a downward facing underside of the floor opposite the hollow body for selectively securing the floor in the closed position.

2. The insect trap receptacle of claim 1, wherein the floor is hingedly mounted to the body and is rotatable relative thereto by at least 90 degrees between the closed position and the open position.

3. The insect trap receptacle of claim 2, wherein the latch is rotatably mounted to the body and moveable between a latched position wherein the latch engages with the underside of the floor, and an open position wherein the latch is disengaged from the underside side of the floor and the floor is rotatable relative to the body.

4. The insect trap receptacle of claim 3, wherein the latch is elastically biased into the latched position.

5. The insect trap receptacle of claim 2, wherein the floor defines a notch for receiving a portion of the latch in the latched position.

6. The insect trap receptacle of claim 2, wherein the body defines a first recess and a second recess on an exterior surface thereof receiving a hinge mount of the floor and the latch, respectively.

7. The insect trap receptacle of claim 6, wherein the hinge mount is formed with the floor and rotatably mounted within the first recess.

8. The insect trap receptacle of claim 6, wherein the latch is rotatably mounted within the second recess.

9. The insect trap receptacle of claim 2, wherein the latch includes:
   a body defining a pressing face oriented radially outward from the body of the receptacle;
   a pair of protrusions extending from lateral sides of the body for rotatably engaging with the body of the receptacle; and
   a latching protrusion extending radially inward from the body for engaging with the bottom side of the floor.

10. The insect trap receptacle of claim 1, wherein the latch engages with a bottom surface of the base defining the downward facing underside of the floor.

11. The insect trap receptacle of claim 10, wherein the perimeter wall has a size and shape corresponding to an inner wall of the lower end of the body, the perimeter wall arranged directly adjacent to and opposing the inner wall of the lower end of the body with the floor in the closed position for sealing the interior of the body relative to the floor.

12. The insect trap receptacle of claim 1, wherein the body defines a plurality of transparent windows arranged about its perimeter.

13. The insect trap receptacle of claim 1, wherein the stiffening ribs are wholly contained within the recess.

14. An insect trap, comprising:
   a trap housing defining an opening for receiving insects from an external environment; and
   a receptacle removably attached to the trap housing, including:
      a body defining an open top end in communication with the trap opening for receiving insects, and an open bottom end; and
      a floor mounted to the body and rotatable between a closed position wherein the floor closes the open bottom end of the body, and an open position wherein the bottom end is open to the external environment, the floor including a base abutting a bottom end of the body, and a planar raised center section extending from the base into a hollow interior of the body with the floor in the closed position, the raised center section defining a planar floor section arranged in the hollow interior of the body and extending continuously over and covering the open bottom end, the raised center section of the floor includes a perimeter wall extending from the base of the floor and a raised platform arranged within the perimeter wall, the perimeter wall defines a corresponding recess formed in an underside of the floor, and a plurality of stiffening ribs defined by the floor are arranged at least partially within the recess.

15. The insect trap of claim 14, further comprising a latch for selectively securing the floor in the closed position.

16. The insect trap of claim 15, wherein the latch is rotatably mounted to the body and moveable between a latched position wherein the latch engages with the floor, and an open position wherein the latch is disengaged from the floor and the floor is rotatable relative to the body.

17. The insect trap of claim 16, wherein the latch is elastically biased into the latched position by a spring.

18. The insect trap of claim 16, wherein the latch extends below and engages with a downward facing underside of the floor opposite the body in the latched position.

19. The insect trap of claim 14, further comprising a locking ring selectively fixable to the top end of the body and including a locking feature for selectively engaging with the trap housing.

\* \* \* \* \*